(12) United States Patent
Eshleman et al.

(10) Patent No.: US 8,447,721 B2
(45) Date of Patent: May 21, 2013

(54) INTEREST-DRIVEN BUSINESS INTELLIGENCE SYSTEMS AND METHODS OF DATA ANALYSIS USING INTEREST-DRIVEN DATA PIPELINES

(75) Inventors: John Glenn Eshleman, Mountain View, CA (US); Benjamin Mark Werther, Burlingame, CA (US); Kevin Scott Beyer, San Francisco, CA (US); Brian F. Babcock, Palo Alto, CA (US); Yewei Zhang, Fremont, CA (US)

(73) Assignee: Platfora, Inc., San Mateo, CA (US)

( * ) Notice: Subject to any disclaimer, the term of this patent is extended or adjusted under 35 U.S.C. 154(b) by 0 days.

(21) Appl. No.: 13/408,872

(22) Filed: Feb. 29, 2012

(65) Prior Publication Data

US 2013/0013552 A1  Jan. 10, 2013

Related U.S. Application Data

(60) Provisional application No. 61/505,271, filed on Jul. 7, 2011.

(51) Int. Cl.
 *G06F 17/30* (2006.01)
(52) U.S. Cl.
 USPC .......................................... 707/602; 707/737
(58) Field of Classification Search
 USPC .......... 707/602, 737, 754, 755, 805; 709/201, 709/219, 229
 See application file for complete search history.

(56) References Cited

U.S. PATENT DOCUMENTS

| | | | | |
|---|---|---|---|---|
| 7,151,438 B1 * | 12/2006 | Hall et al. | ............... | 707/999.101 |
| 2012/0130987 A1 * | 5/2012 | Bose et al. | .................... | 707/718 |

OTHER PUBLICATIONS

Borthakur, Dhruba et al., "Apache Hadoop Goes Realtime at Facebook", SIGMOD '11 Proceedings of the 2011 ACM SIGMOD International Conference on Management of data, 1071-1080.
Cohen, Jeffrey et al., "MAD Skills: New Analysis Practices for Big Data", Proceedings of the VLDB Endowment, vol. 2 Issue 2, Aug. 2009, 1481-1492.
Condie, Tyson et al., "MapReduce Online", Available online at http://www.eecs.berkeley.edu/Pubs/TechRpts/2009/EECS-2009-136.html, 1-15.
Kossmann, Donald , "The State of the Art in Distributed Query Processing", ACM Computing Surveys, vol. 32 Issue 4, Dec. 2000, 422-469.
Morfonios, Konstantinos et al., "ROLAP Implementations of the Data Cube", ACM Computing Surveys, vol. 39, No. 4, Article 12, Oct. 2007, 12:1-12:53.
Nandi, Arnab et al., "Guided Interaction: Rethinking the Query-Result Paradigm", Proceedings of the VLDB Endowment, vol. 4, No. 12, Aug. 2011, 1466-1469.
Shvachko, Konstantin et al., "The Hadoop Distributed File System", 2010 IEEE 26th Symposium on Mass Storage Systems and Technologies (MSST), 1-10.

* cited by examiner

*Primary Examiner* — Marc Filipczyk
(74) *Attorney, Agent, or Firm* — Kauth, Pomeroy, Peck & Bailey LLP

(57) ABSTRACT

Interest-driven Business Intelligence (BI) systems in accordance with embodiments of the invention are illustrated. In one embodiment of the invention, a data processing system includes raw data storage containing raw data, metadata storage containing metadata that describes the raw data, and an interest-driven data pipeline that is automatically compiled to generate reporting data using the raw data, wherein the interest-driven data pipeline is compiled based upon reporting data requirements automatically derived from at least one report specification defined using the metadata.

10 Claims, 17 Drawing Sheets

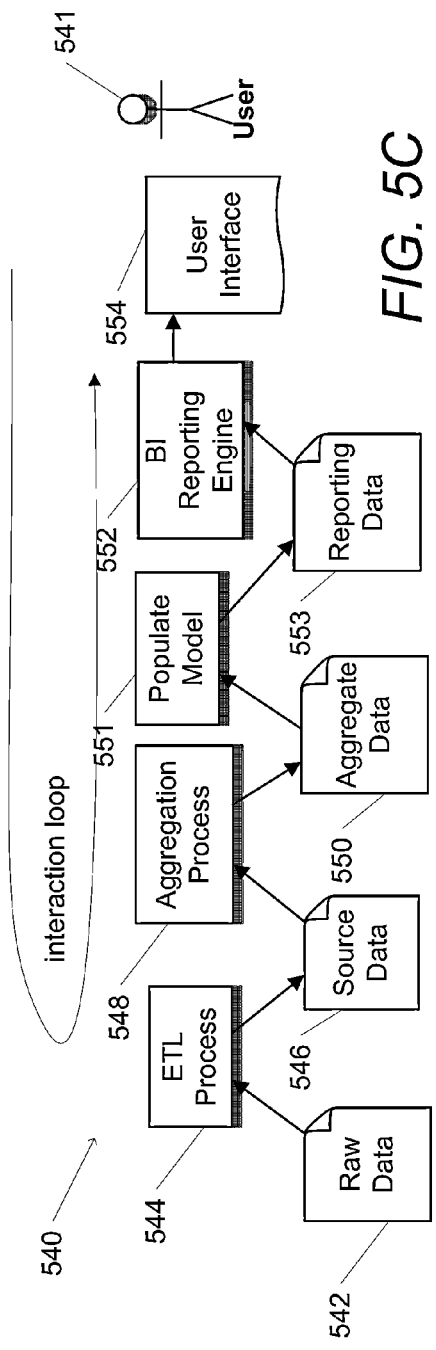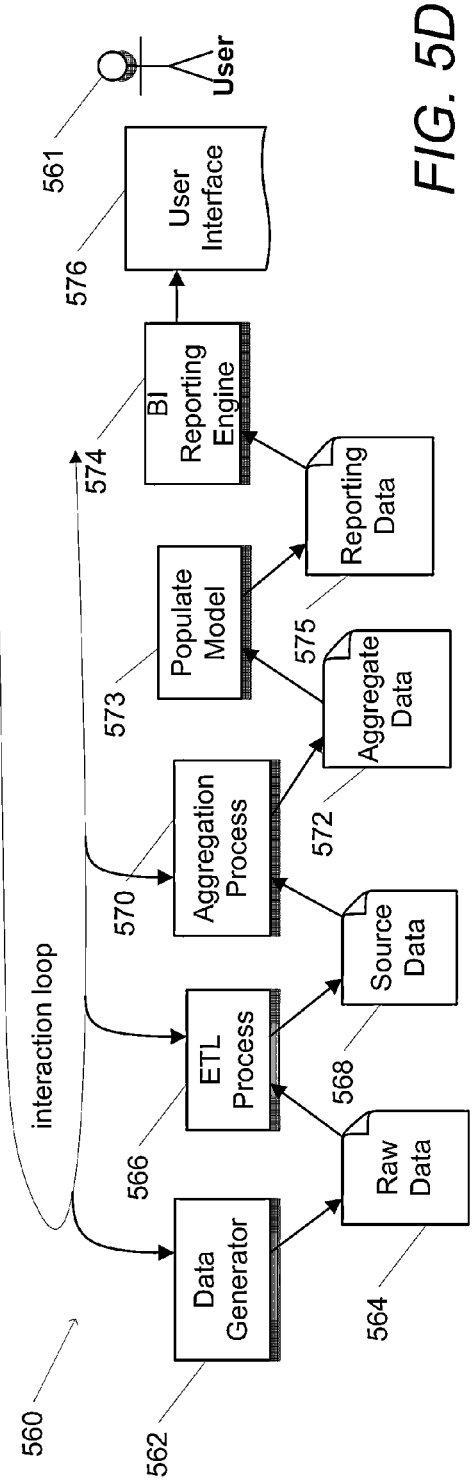

INTEREST-DRIVEN BUSINESS INTELLIGENCE SYSTEMS AND METHODS OF DATA ANALYSIS USING INTEREST-DRIVEN DATA PIPELINES

CROSS-REFERENCE TO RELATED APPLICATIONS

The current application claims priority to U.S. Provisional Patent Application No. 61/505,271, filed Jul. 7, 2011, the disclosure of which is incorporated herein by reference.

FIELD OF THE INVENTION

The present invention relates to business intelligence systems, specifically interest-driven business intelligence systems and methods of data analysis using interest-driven data pipelines.

BACKGROUND OF THE INVENTION

Business intelligence refers to techniques for identifying, processing, and analyzing business data. Business intelligence systems can provide historical, current, and predictive views of business operations. Business data, generated during the course of business operations, including data generated from business processes and the additional data created by employees and customers, may be structured, semi-structured, or unstructured depending on the context and knowledge surrounding the data. In many cases, data generated from business processes is structured, whereas data generated from customer interactions with the business is semi-structured or unstructured. Due to the amount of data generally generated during the course of business operations, business intelligence systems are commonly built on top of and utilize a data warehouse.

Data warehouses are utilized to store, analyze, and report data; for example, business data. Data warehouses utilize databases to store, analyze, and harness the data in a productive and cost-effective manner. A variety of databases are commonly utilized, such as a relational database management system (RDBMS), such as the Oracle Database from the Oracle Corporation of Santa Clara, Calif., or a massively parallel processing analytical database, such as Teradata from the Teradata Corporation of Miamisburg, Ohio. Business intelligence (BI) and analytical tools, such as SAS from SAS Institute, Inc. of Cary, N.C., are used to access the data stored in the database and provide an interface for developers to generate reports, manage and mine the stored data, perform statistical analysis, business planning, forecasting, and other business functions. Most reports created using BI took are created by database administrators, and the underlying database may be tuned for the expected access patterns. A database administrator may index, pre-aggregate or restrict access to specific relations, allow ad-hoc reporting and exploration.

Online transaction processing (OLTP) systems are designed to facilitate and manage transaction-based applications. OTLP may refer to a variety of transactions such a database management system transactions, business, or commercial transactions. OLTP systems typically have low latency response to user requests.

Online analytical processing (OLAP), a modification of OLTP, is an approach to answering multidimensional analytical queries. OLAP tools enable users to analyze multidimensional data utilizing three basic analytical operations: consolidation (aggregating data), drill-down (navigating details of data), and slice and dice (take specific sets of data and view from multiple viewpoints). The basis for any OLAP system is an OLAP cube. An OLAP cube is a data structure allowing for fast analysis of data with the capability of manipulating and analyzing data from multiple perspectives. OLAP cubes typically are composed of numeric facts, called measures, categorized by dimensions. These facts and measures are commonly created from a star schema or a snowflake schema of tables in a RDBMS.

A snowflake schema is an arrangement of tables in a RDMBS, with a central fact table connected to one or more dimension tables. The dimension tables in a snowflake schema are normalized into multiple related tables—for a complex schema there will be many relationships between the dimension tables, resulting in a schema which looks like a snowflake. A star schema is a specific form of a snowflake schema having a fact table referencing one or more dimension tables. However, in a star schema, the dimensions are normalized into a single table—the fact table is the center and the dimension tables are the "points" of the star.

Returning to OLAP systems, measures are derived from fact tables, which are typically composed of the measurements or data of a business process. Dimensions are derived from the dimension tables. In other words, a measure has a set of labels, where the description of the labels is described in the corresponding dimension. Two varieties of OLAP took are commonly used: relational. OLAP (ROLAP) and multidimensional OLAP NOLAN. Both ROLAP and MOLAP are designed to allow analysis of data through the use of a multidimensional data model.

ROLAP took access the data in a relational database and generate SQL queries to calculate information at the appropriate level when an end user requests it. With ROLAP, it is possible to create additional database tables (summary tables or aggregations), which summarize the data at any desired combination of dimensions. While ROLAP uses a relational database source, generally the database must be carefully designed for ROLAP use. A database which was designed for OLTP will not function well as a ROLAP database. Therefore, ROLAP still involves creating an additional copy of the data. However, since it is a database, a variety of technologies can be used to populate the database. One example of a ROLAP tool is the Pentaho BI Suite from the Pentaho Corporation of Orlando, Fla.

MOLAP took differ from ROLAP took in that MOLAP took often involve the pre-computation and storage of information in an OLAP cube. Most MOLAP solutions store this data as an in-memory multidimensional array, rather than in a relational database. This pre-processing and storage of data allows for fast query performance due to optimized storage, multidimensional indexing and caching, and automated computation of higher level aggregates of the data. However, the pre-processing and storage of data has some disadvantages, such as a long processing step, especially when dealing with large volumes of data. MOLAP took traditionally have difficulty querying models with dimensions with very high cardinality or a large number of dimensions. One example of a MOLAP tool is the Cognos Powerplay system from International. Business Machines of Armonk, N.Y.

Predictive analytics encompasses a variety of statistical techniques from modeling, data mining and game theory that analyze current and historical facts to make predictions about future events. Generally, when referring to business intelligence systems, the term predictive analytics is used to mean predictive modeling, "scoring" data with predictive models, and forecasting.

SUMMARY OF THE INVENTION

Businesses are increasingly capturing and storing machine generated data, such as server logs or records of user interactions with a system, resulting in the generation of extremely large amounts of data. Accordingly, machine-generated data is exposing many of the limitations of traditional. BI systems that are not designed to handle such large volumes of data. The systems used to store such large volumes of data are typically high-latency and, therefore, provide very poor interactivity. Traditional business intelligence systems often utilize an in-memory processing model where datasets are loaded into system memory for analysis from a data warehouse using a data pipeline. Existing systems utilizing this method require a significant amount of labor by highly trained engineers and business intelligence analysts to build the data pipeline to populate the in-memory dataset based upon the raw data. Further, there is no active updating of the in-memory dataset once the data pipeline has been built. Changes or updates to the data pipeline typically involve further efforts from the supporting engineers and analysts and the end user typically does not have visibility concerning data that is not in the in-memory data set that may be available for analysis.

Interest-driven Business Intelligence (BI) systems in accordance with embodiments of the invention are capable of managing huge datasets in a way that provides a user with complete visibility into the available data and the ability to dynamically reconfigure the BI system's data pipeline to provide access to desired information.

Systems and methods for interest-driven business intelligence systems in accordance with embodiments of the invention are illustrated. In one embodiment of the invention, a data processing system includes raw data storage containing raw data, metadata storage containing metadata that describes the raw data, and an interest-driven data pipeline that is automatically compiled to generate reporting data using the raw data, wherein the interest-driven data pipeline is compiled based upon reporting data requirements automatically derived from at least one report specification defined using the metadata.

In another embodiment of the invention, the interest-driven data pipeline is automatically compiled based upon at least one change selected from the group consisting of a change to the reporting data requirements, a change to the metadata, and a change to the raw data.

In an additional embodiment of the invention, the data processing system further includes source data storage configured to store source data, wherein the interest-driven data pipeline is configured to create source data by performing an extract, transform, and load (ETL) process on raw data using a source model.

In yet another embodiment of the invention, the data processing system further includes aggregate data storage configured to store aggregate data, wherein the interest-driven data pipeline is configured to generate aggregate data by performing aggregations using the source data.

In still another embodiment of the invention, the interest-driven data pipeline is configured to generate aggregations utilizing the reporting data requirements.

In still yet another embodiment of the invention, the data processing system further includes an intermediate processing layer, wherein the intermediate processing layer includes a data manager configured to store data models and an interest-driven data pipeline compiler.

In yet another embodiment of the invention, the intermediate processing layer accesses data within the raw data storage.

In still another embodiment of the invention, the interest-driven data pipeline is automatically compiled utilizing the interest-driven data pipeline compiler.

In still yet another embodiment of the invention, the intermediate processing layer is configured to perform raw data intake comprising updating raw data and updating reporting data.

In yet another embodiment of the invention, the data processing system is configured as an interest-driven business intelligence system including a business intelligence reporting engine, wherein the business intelligence reporting engine includes reporting data storage configured to store reporting data.

In still another embodiment of the invention, the business intelligence reporting engine comprises a user interface configured to display data and receive requests for data.

In still yet another embodiment of the invention, the interest-driven business intelligence system further includes report specification storage configured to store report specifications, wherein the interest-driven business intelligence system is configured to receive at least one report specification.

In yet another embodiment of the invention, the interest-driven data pipeline is configured to automatically generate reporting data requirements using at least one report specification.

In still another embodiment of the invention, the business intelligence reporting engine is configured to generate a report utilizing the report specification and the reporting data.

In still yet another embodiment of the invention, the interest-driven business intelligence system includes an interest-driven data pipeline compiler, wherein the interest-driven data pipeline is configured to convert the raw data into source data utilizing an extract, transform, and load (ETL) process, utilize the reporting data requirements to generate aggregation processes that are applied to the source data to generate aggregate data, and generate a data model based upon the reporting data requirements and to populate the data model using the aggregate data to generate reporting data; wherein the interest-driven data pipeline compiler is configured to automatically compile the interest-driven data pipeline in response to the interest-driven business intelligence system receiving a report specification modifying the reporting data requirements.

In yet another embodiment of the invention, the interest-driven data pipeline compiler is configured to update the ETL process in response to the modifications to the reporting data requirements.

In still another embodiment of the invention, the interest-driven data pipeline compiler is configured to generate new aggregations in response to the modifications to the reporting data requirements.

In still yet another embodiment of the invention, the interest-driven data pipeline compiler is configured to generate a new data model in response to the modifications to the reporting data requirements.

In yet another embodiment of the invention, the report comprises at least one visualization, where the at least one visualization is configured to process and display reporting data.

Yet another embodiment of the invention includes an interest-driven business intelligence system, including raw data storage system configured to contain raw data and perform ETL processes, metadata storage configured to contain metadata that describes the raw data, aggregate data storage configured to contain aggregate data generated using ETL processes from the raw data, a business intelligence reporting engine configured to receive user explorations of the metadata that define at least one report specification, and an intermediate processing layer, where the intermediate processing layer is configured to automatically derive reporting data requirements from the at least one report specification and compile an interest-driven data pipeline based upon the reporting data requirements, where automatically compiling the interest-driven data pipeline includes generating ETL processing jobs to generate aggregate data from the raw data and generating reporting data using the aggregate data, wherein the business intelligence reporting engine is configured to generate at least one report based upon the at least one report specification using the reporting data, wherein the business intelligence reporting engine is configured to provide interactive exploration of the at least one report, wherein the business intelligence reporting engine is configured to update the reporting data requirements in real time based upon the interactive exploration of the at least one report, and wherein the intermediate processing layer is configured to automatically recompile the interest-driven data pipeline in to generate additional reporting data in response to changes in the reporting data requirements.

In yet another embodiment of the invention, the raw data storage system is a data warehouse.

In still another embodiment of the invention, the data warehouse is implemented utilizing a system selected from the group consisting of a distributed computing system, a database management system, and a NoSQL database.

In still yet another embodiment of the invention, the data warehouse is a distributed computing system implemented utilizing Hadoop.

In yet another embodiment of the invention, the data warehouse is configured to store data generated utilizing the intermediate processing layer.

In still another embodiment of the invention, the intermediate processing layer is configured to generate data warehouse requests.

In still yet another embodiment of the invention, the data warehouse requests are requests selected from the group consisting of Hive queries and MapReduce operations.

In yet another embodiment of the invention, the intermediate processing layer is implemented utilizing a system selected from the group consisting of a distributed computing system, a database management system, and a NoSQL database system.

In still another embodiment of the invention, the business intelligence reporting engine is configured to display an indication based upon the interactive exploration of the at least one report.

In still yet another embodiment of the invention, the indication is an estimate of the time needed to update the reporting data requirements.

Yet another embodiment of the invention includes creating a report utilizing an interest-driven business intelligence system, including storing raw data in raw data storage, receiving report definitions generated utilizing metadata describing the raw data using the interest-driven business intelligence system, automatically generating reporting data requirements derived from report definitions using the interest-driven business intelligence system, automatically compiling an interest-driven data pipeline that is part of the interest-driven business intelligence system using the reporting data requirements and the raw data, generating reporting data from the reporting data requirements using the interest-driven data pipeline, populating reports with the reporting data using the interest-driven business intelligence system, providing interactive exploration of the reports using the interest-driven business intelligence system, and automatically compiling the interest-driven data pipeline to generate additional reporting data in response to changes in the reporting data requirements defined during the interactive exploration of the reports using the interest-driven business intelligence system.

BRIEF DESCRIPTION OF THE DRAWINGS

FIG. 5C is a diagram illustrating an interaction with an interest-driven data pipeline where reporting data is modified in accordance with an embodiment of the invention.

FIG. 5D is a diagram illustrating an interaction with an interest-driven data pipeline where various aspects of the interest-driven data pipeline are modified in accordance with an embodiment of the invention.

DETAILED DISCLOSURE OF THE INVENTION

Figure 1:
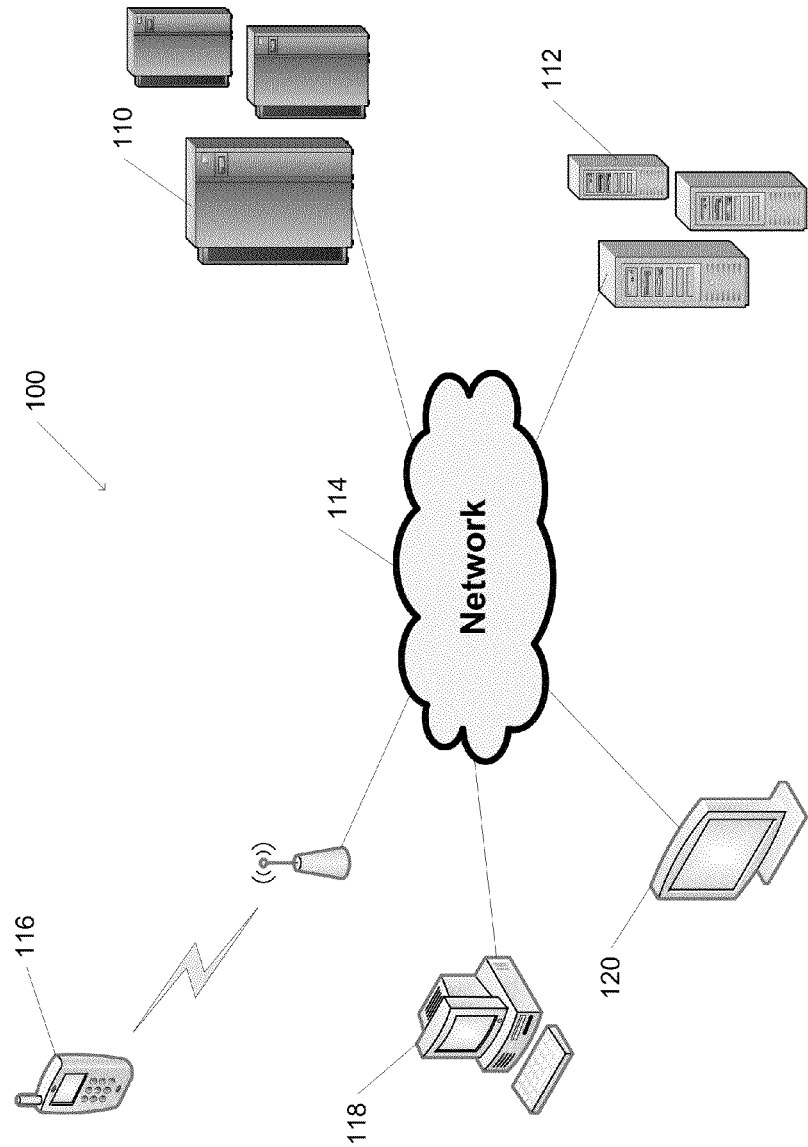
FIG. 1 is a network diagram of a business intelligence system in accordance with an embodiment of the invention.

Turning now to the drawings, interest-driven Business Intelligence (BI) systems in accordance with embodiments of the invention are illustrated. BI systems are a specific kind of data processing systems adapted for business uses, however, the systems and methods described below are applicable to any data processing system. The term "interest-driven" can be used to describe a class of BI system that is able to dynamically build a data pipeline to provide an end user with information of interest. In many embodiments, interest-driven BI systems are capable of managing huge datasets in a way that provides a user with complete visibility into the available data and the ability to dynamically reconfigure the BI system's data pipeline to provide access to desired information.

In several embodiments, an interest-driven BI system accumulates raw data in a raw data storage system. An interest-driven data pipeline can then load source data into a data warehouse using and Extract, Transform, Load (ETU process. In a number of embodiments, the ETL process involves extracting data from data sources, transforming the data, and loading the data into data storage in accordance with data processing techniques known to those of ordinary skill in the art. The interest-driven data pipeline then fillers and/or aggregates the source data based upon a schema to create reporting data. A data aggregation is typically understood as referring to a function where multiple pieces of data are grouped together to form a single value; filtering involves creating subsets of data. Throughout the specification, the term aggregation is used to describe aggregation and/or filtering processes. Common data aggregations include but are not limited to taking an average, counting, summing, finding the maximum, value, the minimum value, the median value and/or the mode. In many embodiments, the reporting data is stored in a data mart and used to generate visualizations in reports displayed to a user by the BI system. Due to the interest-driven nature of the data pipeline, the ETL processes and the filtering and aggregation processes utilized to generate the reporting data can be dynamically reconfigured based upon the data that is of interest to a user. At each stage in the interest-driven data pipeline, metadata concerning the underlying data is passed forward to the user. Accordingly, the user is aware of all available data. In the event that data of interest is not included in the reporting data provided by the interest-driven data pipeline, then the interest-driven BI system dynamically rebuilds the interest driven data pipeline to make the data available within the reporting data for exploration by the user.

Utilizing an interest-driven data pipeline can reduce or eliminate the need for engineers or business intelligence analysts to hand-tune a data pipeline. Instead of relying upon engineers or business intelligence analysts to build a data set for analysts to query, an interest-driven data pipeline is automatically modified in real time in response to a variety of human and non-human factors, including incoming data, changing schema, evolutions in the business intelligence data, or in response to actions taken by an analyst. An example of an interest-driven data pipeline in action is when an additional data source or field within an existing data source becomes available. The description of this additional data can either be specified or automatically detected and then this metadata can be automatically pushed forward all the way through the interest-driven BI system so that end users can utilize the additional data without having to pay the upfront cost of transforming and materializing the additional data, which would require an investment of time and labor from supporting engineers and analysts in a traditional data pipeline.

In a number of embodiments, the accumulation of raw data, the ETL processing of the raw data to create source data, and the storage of the source data in a data warehouse are performed using a distributed computing platform such as (but not limited to) Apache Hadoop, which is often referred to simply as Hadoop. Distributed computing platforms provide a relatively inexpensive, reliable, and scalable storage layer capable of growing to store petabytes of data utilizing commodity hardware. In addition, distributed computing platforms are capable of parallel processing of data, utilizing MapReduce, queries, and other processing methods.

While distributed computing platforms can store massive amounts of data, distributed computing platforms commonly have a very poor response time, where jobs or queries can take minutes or even hours. Additionally, while MapReduce is a powerful tool for those engineers highly skilled in parallel processing techniques, the use of MapReduce is beyond the scope of most engineers and analysts. In order to achieve highly interactive performance, an interest-driven BI system can dynamically build the stages of a multi-stage data pipeline to load data of interest into system memory based on the desired end-consumption of the data. Changes specified at the report level can be automatically compiled and traced backward by the interest-driven BI system to create an appropriate data pipeline to meet the new report requirements.

In a number of embodiments, the interest-driven data pipeline is built by an intermediate processing layer that sits between a business intelligence front-end used by business analysts and a distributed computing platform. This intermediate processing layer can receive requests from business analysts or other users, and automatically create an interest-driven data pipeline to retrieve data from the distributed computing platform, perform any necessary processing, and return reporting data for in-memory exploration by the user. Often, the intermediate processing layer stores reporting data in data marts for exploration by users. The intermediate processing layer can be implemented on a single machine or parallelized across multiple systems, providing for a platform which can respond as quickly as an in-memory business intelligence system without the limitations of a conventional in-memory business intelligence system. Accordingly, an analyst using an interest-driven BI system can rapidly generate frequently used reports using data retrieved and held in-memory by the intermediate processing layer and at the same time has the ability to drill down into the underlying raw data utilizing the interest-driven data pipeline. Interest-driven BI systems and methods for dynamically building interest-driven data pipelines in accordance with embodiments of the invention are discussed further below.

System Overview

An interest-driven BI system in accordance with an embodiment of the invention is illustrated in FIG. 1. The interest-driven BI system 100 includes a distributed computing platform 110 configured to store raw business data. The distributed computing platform 110 is configured to communicate with an intermediate processing system 112 via a network 114. In several embodiments of the invention, the network 114 is a local area network. In many embodiments, the distributed computing platform 110 communicates with the intermediate processing system 112 via the Internet 114. The intermediate processing system 112 is also configured to communicate with one or more client devices, including cellular telephones 116, personal computers 118, and presentation devices 120 utilizing a network 114. In many embodiments of the invention, the client devices include any computing device capable of receiving and/or displaying data. In several embodiments of the invention, the client devices are configured to communicate with the intermediate processing system 112. In a number of embodiments, the client devices are configured to communicate with the data warehouse 110.

In many embodiments of the invention, the distributed computing platform 110 is a cluster of computers configured as a distributed computing platform utilizing Hadoop. Hadoop is a software library, which allows for distributed processing of data sets across clusters of nodes. Hadoop is designed to scale from one to thousands of nodes, where each node is a computer responsible for its own processing and storage of data. In order to provide reliability as the number of computers scales, Hadoop is designed to detect and handle failures in software and/or hardware, overcoming unreliability in the individual nodes. Hadoop is capable of storing data utilizing the Hadoop Distributed File System (HDFS), running parallel processes utilizing Hadoop MapReduce, and supports SQL-like querying utilizing Hive, along with other functionality provided by various projects, many of which are supported by the Apache Foundation. In a number of embodiments, the distributed computing platform 110 is configured to run jobs generated by the interest-driven BI system utilizing Hadoop MapReduce and queries utilizing Hive. In this way, the distributed computing platform 110 can be configured to act as a raw data storage system and a data warehouse within the interest-driven BI system. In other embodiments, alternative distributed processing systems can be utilized, the distributed processing system can be replaced with a Massively Parallel. Processing architecture and/or a separate data warehouse may be populated by the distributed processing system or an equivalent system configured to manage massive data sets.

In several embodiments, the intermediate processing system 112 is also implemented using one or a cluster of computing devices. The intermediate processing system 112 enables users to specify reports including data visualizations that enable the user to explore the raw data stored within the distributed computing platform 110. Based upon the visualizations specified by the users, the intermediate processing system 112 automatically creates and/or updates one or more interest-driven data pipelines to create or update reporting data. The interest-driven data pipeline is typically configured by pushing down jobs to the distributed computing platform 110 to create source data and then applying various filler and/or aggregation processes to the source data using the intermediate processing system 112 to produce reporting data that is stored in-memory. The process of budding an interest-driven data pipeline is discussed further below.

In many embodiments of the invention, the distributed computing system 110, the intermediate processing system 112, and the client devices 116-120 are implemented utilizing a Service Oriented Architecture (SOA), where, for example, the distributed computing system 110 and intermediate processing system 112 are services communicating through the cloud. In several embodiments, the distributed computing system 110, intermediate processing system 112, and client devices 116-120 are implemented utilizing a multi-tier architecture.

Layers of Interest-Driven BI Systems

Figure 2:
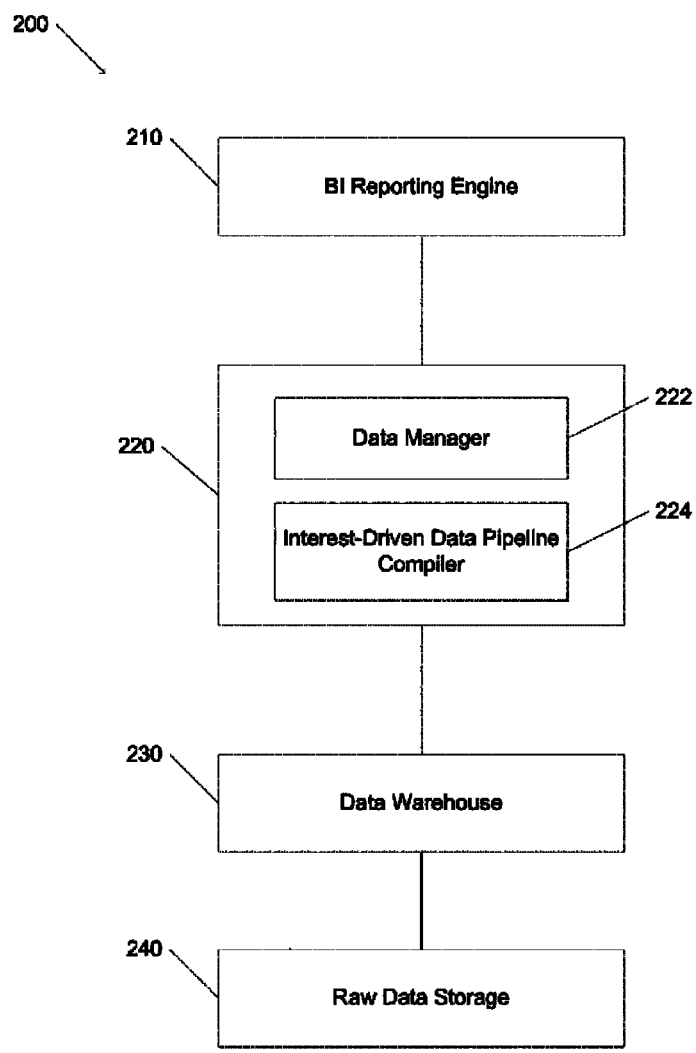
FIG. 2 is a conceptual illustration of an interest-driven business intelligence system in accordance with an embodiment of the invention.

Interest-driven BI systems, such as the system illustrated in FIG. 1, can be understood in terms of conceptual layers that can be developed and deployed independently of each other. A layer diagram illustrating layers of an interest-driven BI system in accordance with an embodiment of the invention is illustrated in FIG. 2. The system 200 contains a BI reporting engine 210. The BI reporting engine 210 includes the user interface and other programming interfaces allowing users and systems to interact with the interest-driven BI system. The interest-driven BI system 200 also contains an intermediate processing layer 220. The intermediate processing layer contains a data manager 222 and an interest-driven data pipeline compiler 224. The intermediate processing layer 220 is designed to process requests from the BI reporting engine 210, manage the data and data models stored in the data manager 222, create, configure, and update an interest-driven data pipeline using the interest-driven data pipeline compiler 224. The interest-driven data pipeline is created by pushing down ETL jobs that load desired source data into a data warehouse layer 230 from a raw data storage layer 240. As discussed above, both the raw data storage layer 240 and the data warehouse layer 230 can be implemented using a distributed computing system such as Hadoop. The interest-driven data pipeline built by the intermediate processing layer 220 also applies filtering and/or aggregation processes to the source data stored in the data warehouse layer 230 to generate reporting data that is held in-memory by the intermediate processing layer for exploration via the BI reporting engine 210.

The intermediate processing layer 220 is not limited to recompiling the interest-driven data pipeline based upon user interactions. When new data becomes available, the intermediate processing layer can dynamically update the models stored in the data manager 222. Metadata concerning the new data is passed to the user via the BI reporting engine 210 and the user can initiate the rebuilding of the interest-driven data pipeline using the data pipeline compiler 224 in order to explore the new data. In a number of embodiments of the invention, the intermediate processing layer 220 provides an application programming interface capable of providing access to a variety of data stored in the intermediate processing layer 220. The application programming interface provides data access to both the BI reporting engine 210 and third-party programs.

Although specific architectures for an interest-driven BI system are illustrated in FIGS. 1 and 2, any of a variety of architectures configured to store large data sets and to automatically build interest-driven data pipelines based upon reports built by users in accordance with embodiments of the invention can also be utilized. Systems and methods for creating, utilizing, and updating interest-driven data pipelines utilizing interest-driven BI systems in accordance with embodiments of the invention are discussed further below.

Exploring Data Using an Interest-Driven BI System

Figure 3:
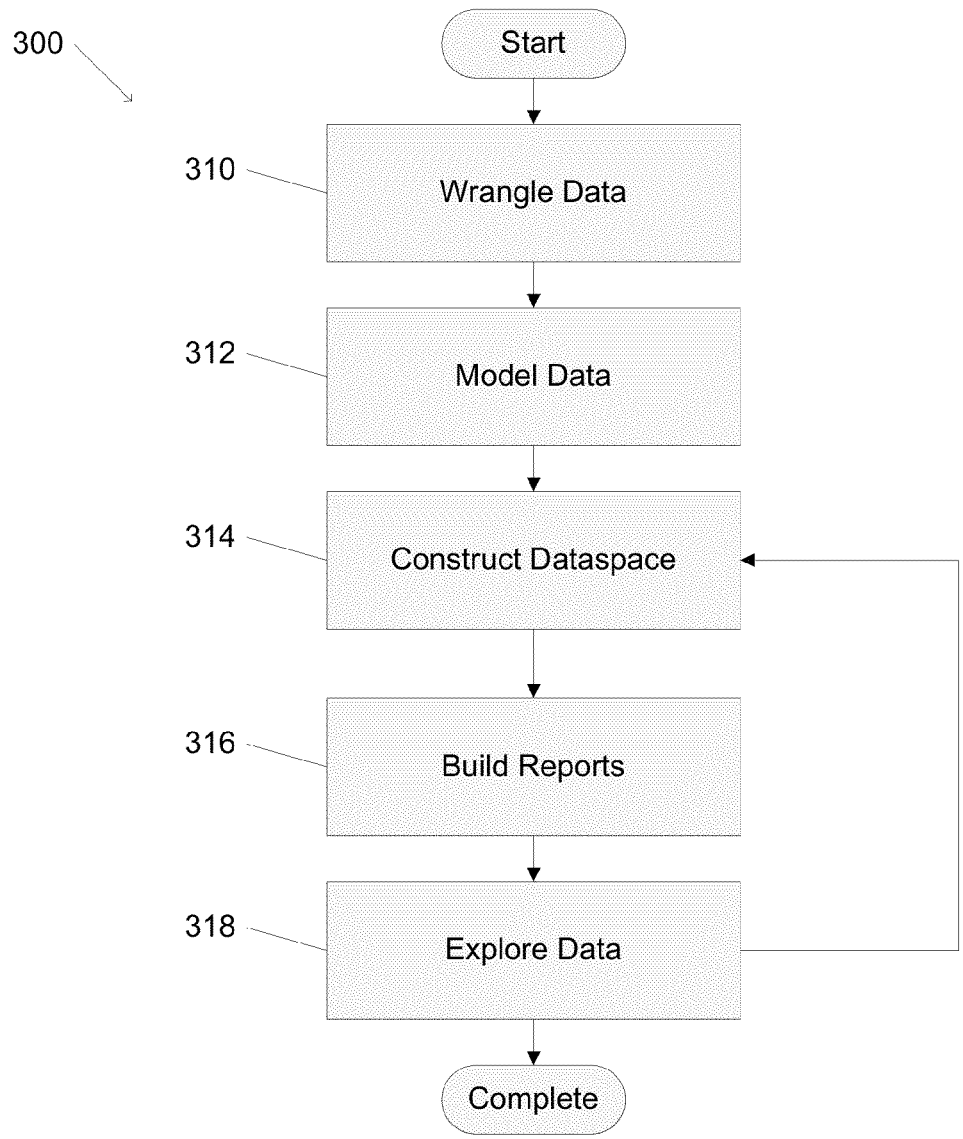
FIG. 3 is a flow chart illustrating a process for exploring data in accordance with an embodiment of the invention.

The primary purpose of an interest-driven BI system is to enable users to explore the raw business data being collected by the BI system. Before the raw data can be explored, the data is characterized and an interest-driven data pipeline is constructed. A high-level overview of the processes that enable the exploration of raw business data using an interest-driven BI system in accordance with an embodiment of the invention is illustrated in FIG. 3. The process 300 involves wrangling (310) data, which involves creating metadata describing the structure to the raw data stored in the interest-driven BI system. The data is then modeled (312). Modeling (312) data involves determining which aspects of the data should be made available and any desired aggregations or fillers. In many embodiments, the aspects of the data are dimensions of a fact table in a star or snowflake schema. A dataspace is constructed (314) using a schema. In many embodiments of the invention, the schema may be a star or snowflake schema. Once the dataspace is constructed, reports may be built (316). Using the reports, users can explore (318) the data. Exploring (318) the data typically involves visualizing the data and identifying various aspects of the data for further exploration. Based on the exploration (318) of data, the dataspace may be updated or a new dataspace may be constructed (314).

Although a specific process for exploring data using an interest-driven BI system is illustrated in FIG. 3, any of a variety of processes that enable the dynamic building of an interest-driven data pipeline can be utilized in accordance with embodiments of the invention. The manner in which the processes described above enable the automatic creation of an interest-driven data pipeline in accordance with embodiments of the invention are discussed further below.

Dynamically Building an Interest-Driven Data Pipeline

An interest-driven BI system in accordance with embodiments of the invention can dynamically build a data pipeline to load reporting data in-memory based upon descriptions of the raw data and report specifications provided by users. Stated another way, the interest-driven BI system takes a description of the raw data provided by a user and a description of the manner in which a user wishes to explore the raw data and dynamically builds a data pipeline to extract the desired data from a raw data storage system for in-memory interactive exploration by a user.

Figure 4:
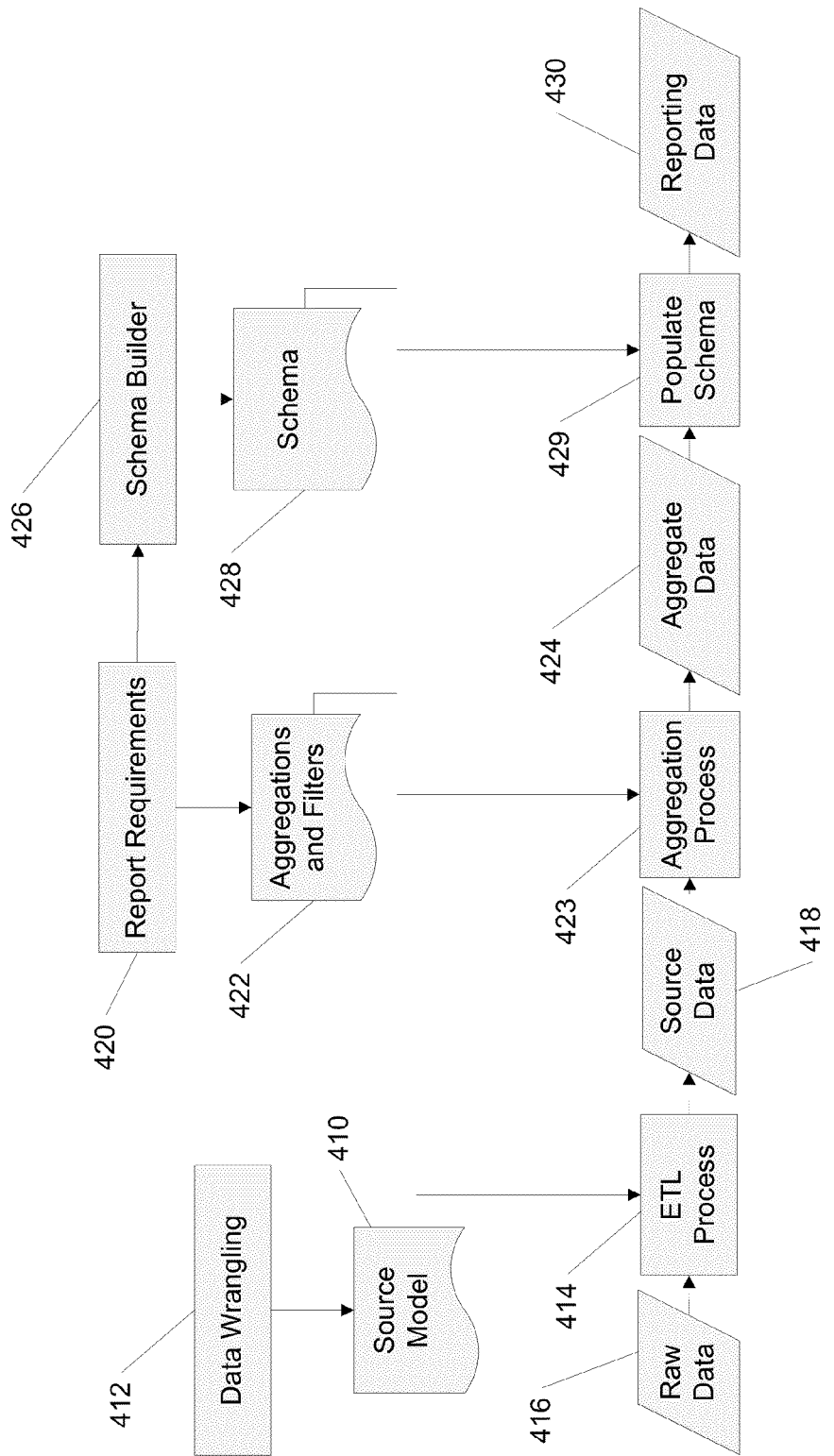
FIG. 4 is a diagram illustrating an interest-driven data pipeline in accordance with an embodiment of the invention.

A process for budding an interest-driven data pipeline in accordance with an embodiment of the invention is illustrated in FIG. 4. The interest-driven data pipeline 400 uses a source model 410 generated utilizing metadata created during a data wrangling process 412 to automatically build an ETL process 414 that takes raw data 416 and generates source data 418. In embodiments where the raw data is stored within a distributed computing system, the ETL processes are generated as jobs that are passed to the distributed computing platform.

Report requirements 420 specified by a user and/or defined within the BI system are used to determine aggregations and/or fillers 422. The aggregations and/or fillers 422 are applied to the source data 418 using an aggregation process 423 that creates aggregate data 424. Where a distributed computing platform generates the source data, the interest-driven BI system can automatically generate jobs that are provided to the distributed computing platform to perform the aggregation and/or filtering associated with the aggregation process 423.

A schema budder 426 can also utilize the report requirements 420 to create a schema 428. In a number of embodiments, the schema is a star schema or a snowflake schema. In other embodiments, any schema appropriate to a specific application can be utilized. A process 429 is applied to the aggregate data 424 to populate the schema 428 to provide reporting data 430 that can be loaded in-memory and used in the interactive generation of reports by users to facilitate the visualization and exploration of the data. In many embodiments, an intermediate processing system builds the schema using the aggregate data generated by a distributed computing platform that holds the raw data. At which point, the reporting data is held in-memory and can be utilized interactively (i.e. in a low-latency fashion). In many embodiments, the reporting data may be utilized in a data processing system other than an interest-driven business intelligence system.

Although a specific process for dynamically building an interest-driven data pipeline is illustrated in FIG. 4, any of a variety of processes can be utilized to automaticatty transform raw data according to the data consumption of end users in accordance with embodiments of the invention. The manner in which interest-driven data pipelines can be dynamically reconfigured in response to user interactions and the addition of new data sources to an interest-driven BI system in accordance with embodiments of the invention are discussed further below.

Interacting with an Interest-Driven Data Pipeline

In many embodiments of the invention, an interest-driven data pipeline is dynamically created or compiled based on user interactions with the system and as new data enters the system. For example, as a user explores the data using the interest-driven BI system, the user can configure a report. Based on the configuration, an interest-driven data pipeline is created or updated by compiling a set of transformations which structure and summarize the data and make it available in a low-latency format for the user to interactively explore. The following five examples further detail how the user interactions with the interest-driven BI system cause changes in the interest-driven data pipeline.

Figure 5A:
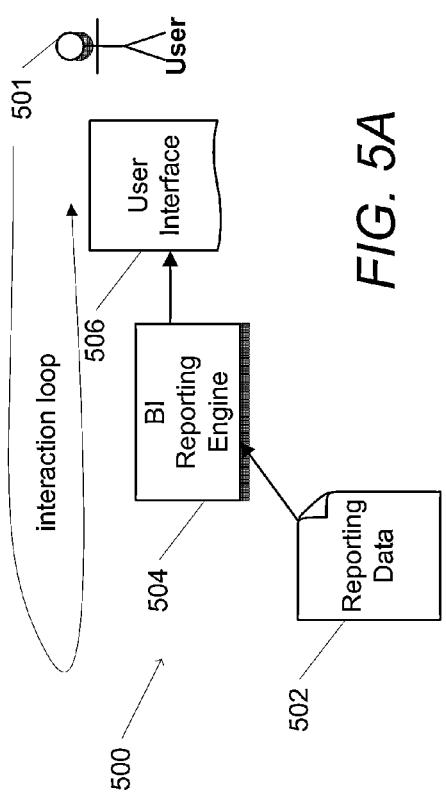
FIG. 5A is a diagram illustrating an interaction with an interest-driven data pipeline in accordance with an embodiment of the invention.

First, as illustrated in FIG. 5A, the user interaction 500 involves the user 501 exploring reporting data 502 using a user interface 506. The user 501 may perform actions supported by the BI reporting engine 504 which involve the user 501 viewing the reporting data 502, such as changing visualizations, changing fillers, or changing aggregating levels. In many embodiments, the reporting data 502 is a schema populated with data from an interest-driven data pipeline. Because the underlying reporting data 502 is unchanged by user 501 actions, the BI reporting engine 504 does not cause any changes in the interest-driven data pipeline.

Figure 5B:
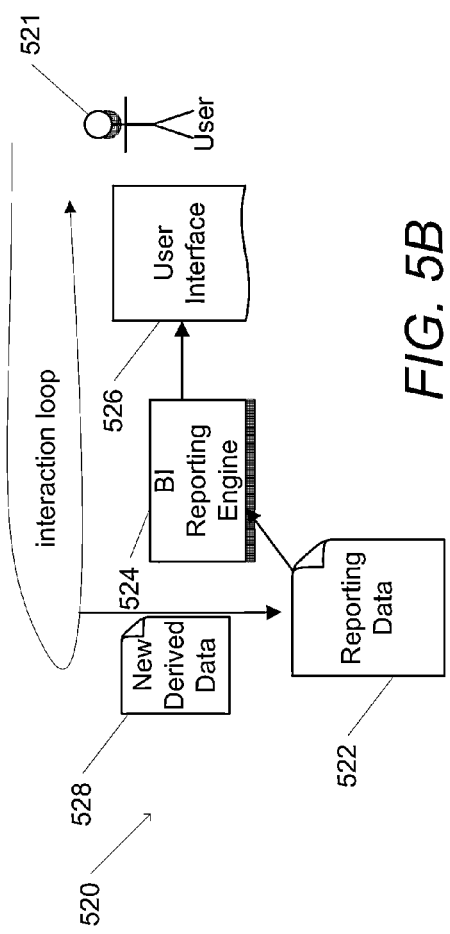
FIG. 5B is a diagram illustrating an interaction with an interest-driven data pipeline where new derived data is created in accordance with an embodiment of the invention.

Turning now to FIG. 5B, a second user interaction 520 is illustrated. The user 521 uses a user interface 526 provided by a BI reporting engine 524 to create new derived data 528 based on the reporting data 522 such as calculated derived measures, computed columns, or sets and populations. The new derived data 528 is fed back into an interest-driven data pipeline, causing the interest-driven data pipeline to update the reporting data 522 based on the new derived data 528. Further, the interest-driven data pipeline may update itself based on the update to the reporting data 522.

A third user interaction is illustrated in FIG. 5C. The user interaction 540 involves the user 541 using a user interface 554 provided by the BI reporting engine 552 in order to modify the aggregation process 548 by changing the data present in the reporting data 550. The modifications provided by the user 541 may take a variety of forms, such as pulling in new source data 546 from the raw data 542 via the ETL process 544, changing the fillers used in the ETL process 544 and the aggregation process 548, changing the aggregation levels used by the aggregation process 548, and/or altering how the reporting data 553 is populated 551 utilizing the aggregate data 550. By changing the reporting data 553, the user 541 causes the interest-driven data pipeline to compile a new aggregation process 548 in order to create the aggregate data 550 used in the population 551 of the reporting data 553. The new aggregation process 548 may involve changes in the ETL process 544 in order to support necessary changes in the source data 546 used by the aggregation process 548. As the interest-driven data pipeline is updated, the reporting data 553 is updated and the user is able to interact with the updated reporting data 553.

A fourth user interaction is illustrated in FIG. 5D. The user interaction 560 involves the user 561 using the user interface 576 provided by the BI reporting engine 574 in order to modifying aspects of the data generator 562 (e.g. adding data sources or modifying the data obtained from the data sources), the ETL process 566, and the aggregation process 570. By modifying the data generator 562, the ETL process 566, and/or the aggregation process 570, the user 561 causes the interest-driven data pipeline to dynamically update, causing new raw data 564, source data 568, and aggregate data 572 to be created and propagating reporting data 575 to the BI reporting engine 574 by utilizing the aggregate data 572 to populate 573 the reporting data 575. Here, the user 561 is able to dynamically reconfigure the interest-driven data pipeline and receive updated reporting data 575 without any hand-tuning by engineers or business analysts.

Figure 5E:
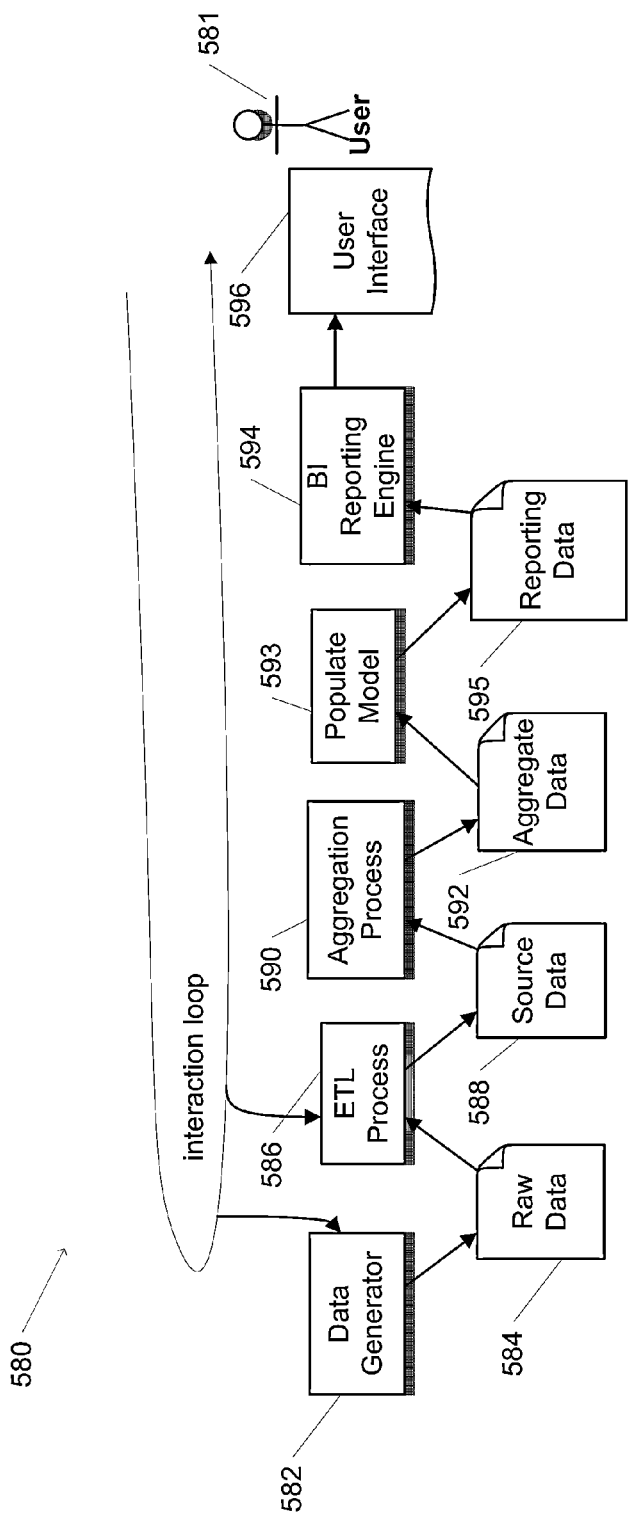
FIG. 5E is a diagram illustrating an interaction with an interest-driven data pipeline where additional sources of data are added in accordance with an embodiment of the invention.

Finally, a fifth user interaction is illustrated in FIG. 5E. The user interaction 580 involves adding new data generators 582, causing new raw data 584 to become available to the interest-driven data pipeline. The user interaction 580 may also involve updates to the ETL process 586, such as updated data processing and normalization based on the new raw data 584 made available. Based on these changes, the interest-driven data pipeline is dynamically reconfigured, causing new source data 588 to be made available for the aggregation process 590, creating new aggregate data 592 which can be utilized to populate 593 new reporting data 595. The BI reporting engine makes the new reporting data 595 available to a user 581 via a user interface 596. In this way, the interest-driven data pipeline dynamically provides access to new data generators.

In the above examples, the user interface may be provided by a BI reporting engine. Although specific examples of user interactions and subsequent effects on interest-driven data pipelines within an interest-driven BI system are described above, these are purely illustrative and any variety of user interactions may be utilized in accordance with embodiments of the invention. Methods for processing and interacting with data utilizing interest-driven BI systems in accordance with embodiments of the invention are discussed further below.

Processing Raw Data in Interest-Driven Data Pipelines

Figure 6:
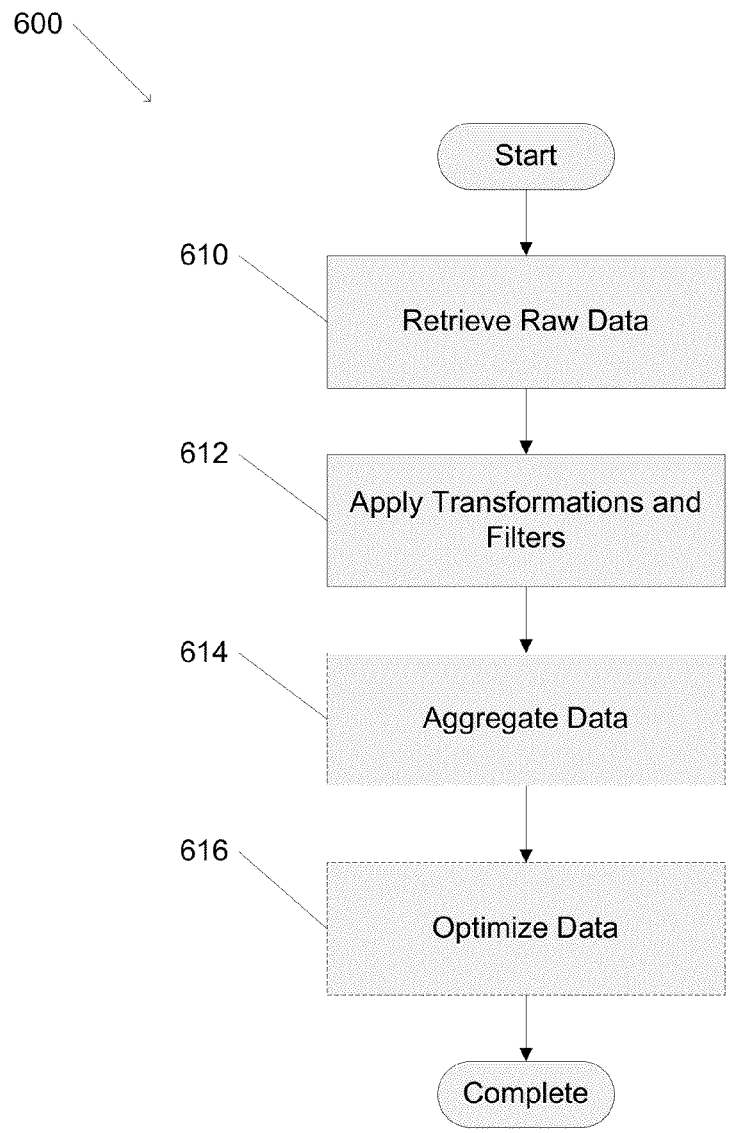
FIG. 6 is a flow chart illustrating a process for processing raw data in accordance with an embodiment of the invention.

Interest-driven data pipelines often involve applying an ETL process to raw data, generating source data for use by users of interest-driven BI systems. A process for processing raw data into source data in accordance with an embodiment of the invention is illustrated in FIG. 6. The process 600 begins with retrieving (610) raw data. In many embodiments, the raw data is machine-generated data. Fillers and transformations are applied (612) to the raw data. In a number of embodiments, the fillers and transformations are defined by characterizing the data. The raw data may also be aggregated (614). In several embodiments, aggregating (614) the data involves reducing the dimensionality of the raw data. Optimizations (616) may also be applied to the raw data. In a number of embodiments, optimizing (616) raw data involves formatting the data for low-latency access.

After process 600 is complete, source data has been created from raw data. In many embodiments, the raw data is preserved to support the creation of new source data or refinement of existing source data at a later time. Although a specific process for generating source data from raw data is illustrated in FIG. 6, any of a variety of processes can be utilized to generate source data from raw data in an interest-driven data pipeline in accordance with embodiments of the invention. Methods for processing and interacting with source data, including methods for creating fillers and transformations, utilizing interest-driven BI system in accordance with embodiments of the invention are discussed further below.

Aggregating Data in Interest-Driven Data Pipelines

Figure 7:
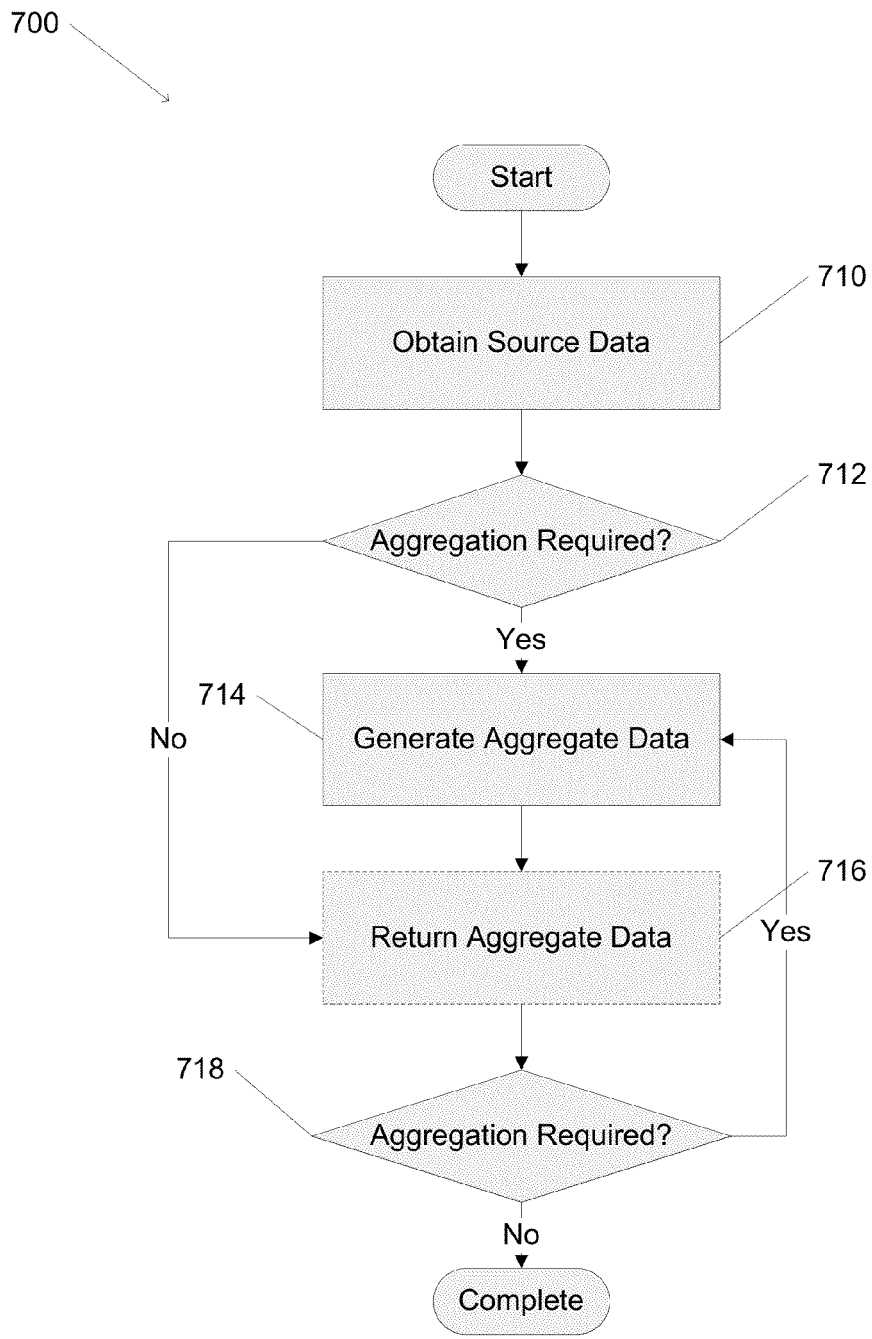
FIG. 7 is a flow chart illustrating a process for aggregating data in accordance with an embodiment of the invention.

In order to support a variety of visualizations and user interactions in interest-driven BI systems, aggregate data is often created utilizing source data in order to provide a variety of views of the data. A process for creating aggregate data in accordance with an embodiment of the invention is illustrated in FIG. 7. The process 700 begins with obtaining (710) source data. A check (712) if aggregation is utilized in the data pipeline is performed. If aggregation is not utilized, the source data may be returned (716) as aggregate data. If aggregation is utilized in the data pipeline, aggregate data is generated (714) utilizing the source data. The aggregate data may be returned (716). Another check (718) is performed to determine if further aggregations are required. If so, additional aggregate data is generated (714). The process 700 completes when no further aggregations are required.

In many embodiments of the invention, the aggregations used to generate (714) aggregate data are determined based on user interactions with the interest-driven BI system. In several embodiments of the invention, the aggregations used to generate (714) aggregate data are determined utilizing an interest-driven data pipeline.

Although a specific process for aggregating source data is described above, any process which aggregates data may be utilized in accordance with embodiments of the invention. Methods for handling data utilizing interest-driven BI systems in accordance with embodiments of the invention are discussed further below.

Identifying and Visualizing Data

Figure 8:
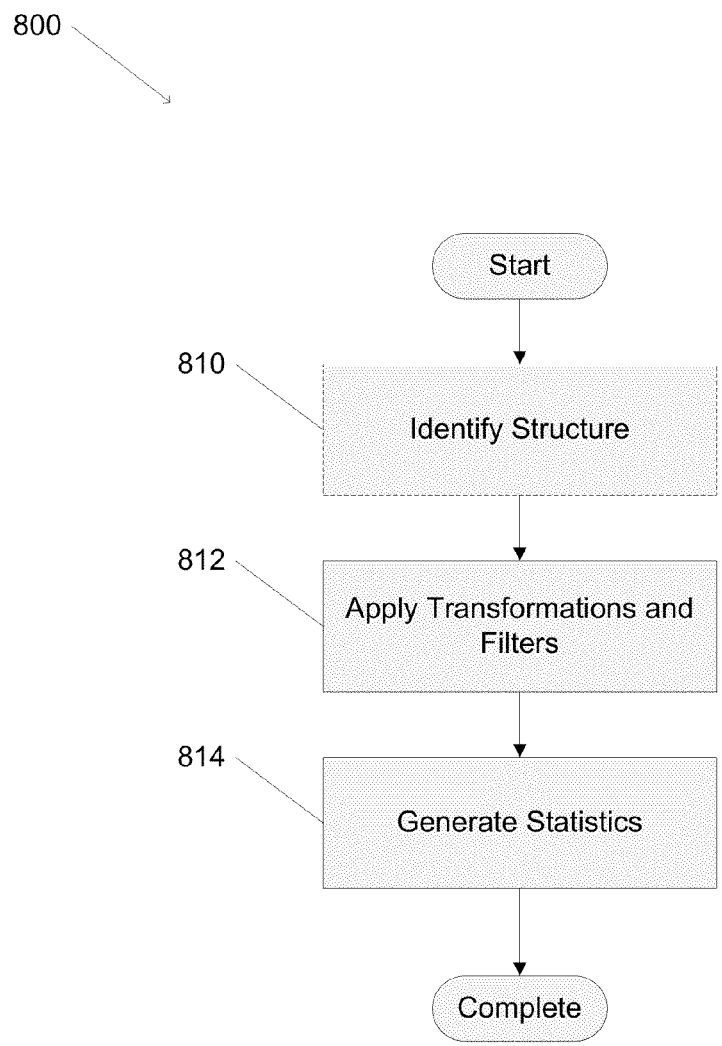
FIG. 8 is a flow chart illustrating a process for data wrangling in accordance with an embodiment of the invention.

In order to create a source model which can be utilized in an ETL process to generate source data from raw data, a user first wrangles the raw data. Data wrangling involves creating metadata providing a structure for parsing raw data and analyzing information related to the raw data. A process for wrangling data in accordance with an embodiment of the invention is illustrated in FIG. 8. Raw data may be structured, semi-tructured, or unstructured. While the structure of structured raw data is already known, the data wrangling process 800 may involve identifying (810) the structure of semi-structured or unstructured raw data. In several embodiments, additional structure may be identified (810) for structured raw data. Identifying (810) the structure of raw data involves defining the meaning and structure of the raw data, such as users selecting and identifying data fields present in the raw data.

Fillers and transformations are applied (812) to the raw data. In many embodiments, the filters and transformations are used to create datasets, which may include sample data rows. Statistics can also be generated (814). The generated statistics can include aspects such as how many rows are in the raw data, how large is the raw data, number of available dimensions or attributes, various statistical distributions, or any other relevant statistical measurement. In many embodiments of the invention, metadata containing the dataset and the generated statistics are utilized by users and interest-driven data pipelines to create and refine source models. Although a specific process for performing data wrangling is shown in FIG. 8, any of a variety of processes for preparing raw data for processing by an interest-driven data pipeline can be utilized in accordance with embodiments of the invention.

Once data wrangling has occurred, the interest-driven data pipeline is capable of utilizing the metadata to construct and populate a variety of in-memory data models. Processes for defining and populating schemas utilizing interest-driven BI systems in accordance with embodiments of the invention are described in more detail below.

Schema Construction in Interest-Driven BI Systems

Figure 9:
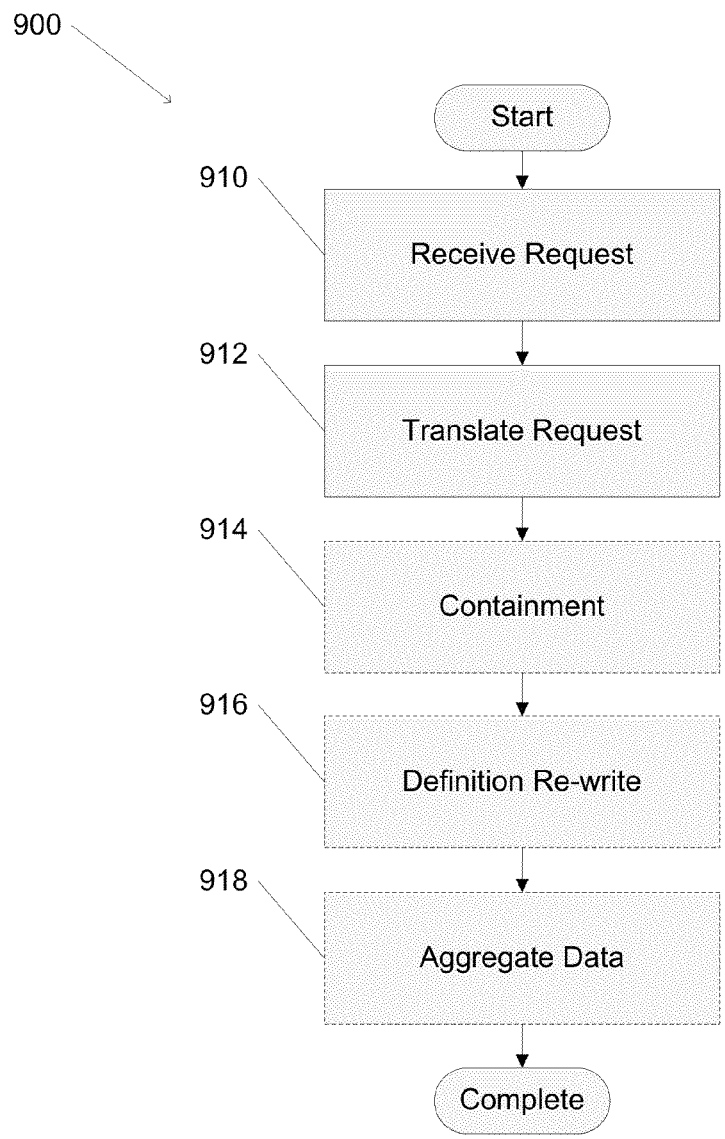
FIG. 9 is a flow chart illustrating a process for generating a schema in accordance with an embodiment of the invention.

In order to support user interactions with data, it is often useful to construct a schema defining the structure and content of reporting data. A process for creating and populating a schema for an in-memory data model for use in data exploration in accordance with an embodiment of the invention is illustrated in FIG. 9. The process 900 involves receiving (910) a request. This request may be a user request related to a new visualization the user wants to create, a modification to an existing report or visualization, or any other action supported in an interest-driven BI system. In several embodiments, the request may be automatically generated by an interest-driven data pipeline. Requests are translated (912) into a schema for an in-memory data model. In several embodiments, the schema is a star or snowflake schema based on the data present in the interest-driven BI system. A containment (914) analysis may be performed in order to determine if a schema capable of partially or fulfilling the request already exists in the interest-driven BI system. The interest-driven data pipeline may re-write (916) the definition of existing schemas.

Schemes may be re-written for a variety of reasons, including optimizing performance and/or resource utilization. Any creation or modification of schemas may also involve additional aggregations (918) to be performed on the data.

In a number of embodiments, if an existing schema fulfills the request, the interest-driven data pipeline can re-write the schema in order to fulfill the request. Schemes may be created or re-written for a variety of reasons, such as including new data, alterations to the fillers applied to data, modifying aggregations of data, or any other modification or alteration to the schema necessary to support the needs of the users or the interest-driven data pipeline.

Once schemas have been created, data may be loaded into in-memory data models using the schemas. The in-memory data models can be explored in a low latency fashion using a BI reporting engine. Although a specific process for building a schema is illustrated in FIG. 9, any of a variety of processes for budding schemas appropriate for use in an interest-driven data pipeline can be utilized in accordance with embodiments of the invention. Processes for using schemas to load data into in-memory data models utilizing interest-driven BI systems in accordance with embodiments of the invention are described in more detail below.

Populating in-Memory Data Structures in Interest-Driven BI Systems

Figure 10:
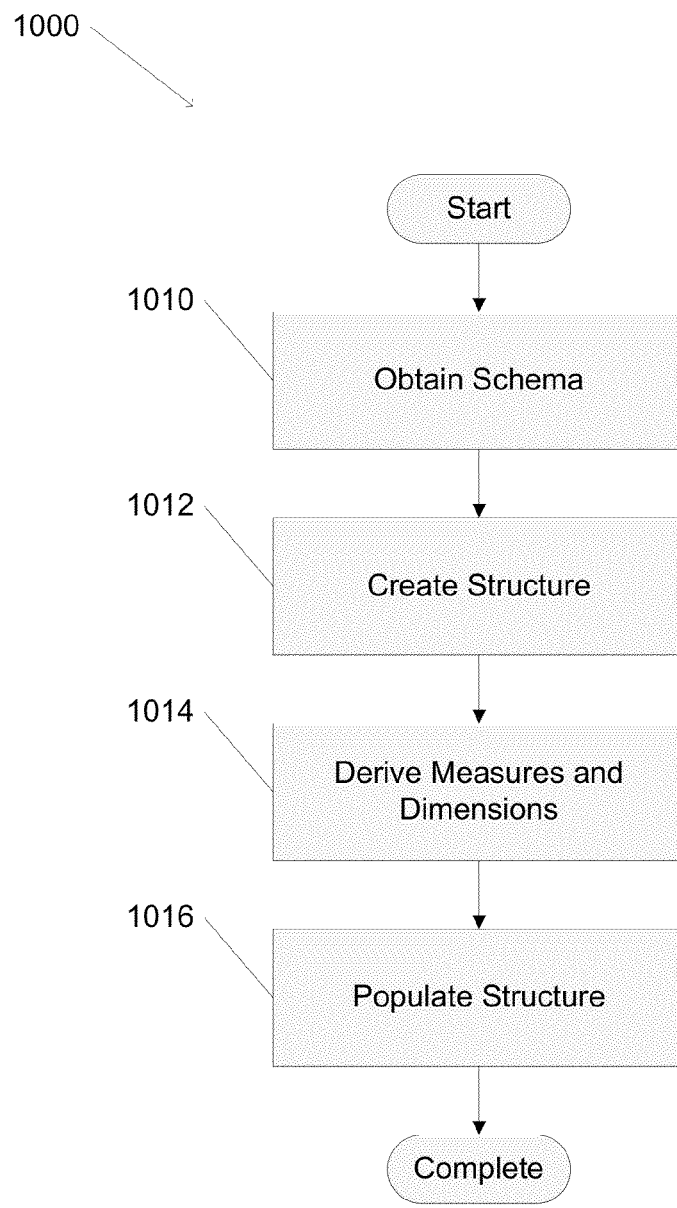
FIG. 10 is a flow chart illustrating a process for constructing an OLAP cube in accordance with an embodiment of the invention.

To provide a low-latency interactive user experience, interest-driven BI systems utilize in-memory data structures to contain the reporting data used to support the reports and visualizations with which the users interact. A process for populating an in-memory data structure in accordance with an embodiment of the invention is illustrated in FIG. 10. The process 1000 involves obtaining (1010) a schema. In a number of embodiments, the schema is a star or snowflake schema. An in-memory data structure is then created (1012) utilizing the schema. In many embodiments, the structure created (1012) is an OLAP cube based on the facts and dimensions defined in the schema.

Measures and dimensions are derived (1014) for the in-memory data structure. Deriving (1014) measures and dimensions may be based on the levels of aggregation desired for the data stored in the in-memory data structure, providing for levels of granularity in the levels of aggregation for the data. The in-memory data structure is populated (1016) with aggregated data utilizing an interest-driven data pipeline.

Although a specific process for loading in-memory data structures is illustrated in FIG. 10, any process for loading data into low latency storage for use by a BI system can be utilized in accordance with embodiments of the invention. Aside from loading data so that it may be analyzed and used by users, interest-driven BI systems are also responsible for the continuous intake of raw data. Processes for processing incoming raw data in interest-driven BI systems in accordance with embodiments of the invention are discussed further below.

Raw Data Intake in Interest-Driven BI Systems

Figure 11:
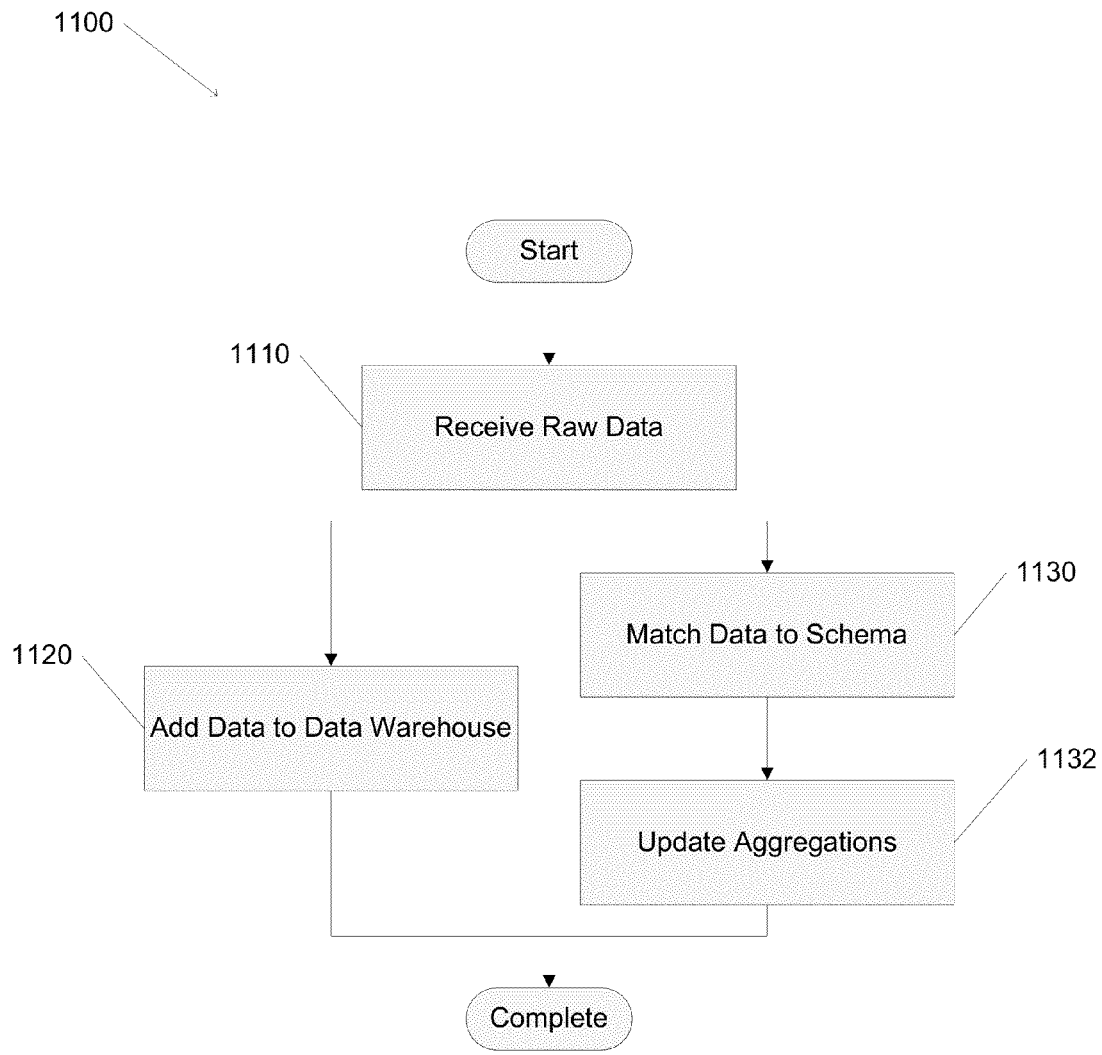
FIG. 11 is a flow chart illustrating a process for data intake in accordance with an embodiment of the invention.

In real-world operation, an interest-driven BI system is continuously adding new raw data and new data sources even as users and interest-driven data pipelines are interacting with the data present in the interest-driven BI system. A process for raw data intake in accordance with an embodiment of the invention is illustrated in FIG. 11. The process 1100 involves receiving (1110) raw data. The raw data received (1110) may be raw data generated in accordance with existing business processes or a new source of raw data. The raw data is added (1120) to the data warehouse. The raw data is also matched (1130) to existing schemas. In a number of embodiments, the matching of raw data to existing schemas is performed utilizing an interest-driven data pipeline. If the raw data matches any existing schemas, updates (1132) to the schemas are performed. The updates (1132) may involve updates to the aggregations of the data utilized by the schema and any related updates to the interest-driven data pipeline.

In order to provide users with the most up-to-date view of the data without incurring the overhead and latency of storing raw data in a data warehouse and retrieving that data to update the interest-driven data pipeline, a number of embodiments of the invention support adding (1120) raw data to the data warehouse and match (1130) data to existing schemas independently of each other using a data manager. The data manager ensures the data warehouse contains the latest version of the raw data for later exploration and mining while the data models currently present in the interest-driven data pipeline can be updated (1132) as quickly as possible, providing users and interest-driven data pipelines with the latest version of the data.

Although a specific process for analyzing real-time data using an interest-driven BI system is illustrated in FIG. 11, any of a variety of processes can be utilized to integrate new data into an interest-driven data pipeline in accordance with embodiments of the invention. In order to utilize the data stored in an interest-driven BI system, a user interface is provided in order to allow users the ability to visualize and interact with the data. Processes for user interaction with data in accordance with embodiments of the invention are discussed further below.

Building Reports in Interest-Driven BI Systems

Figure 12:
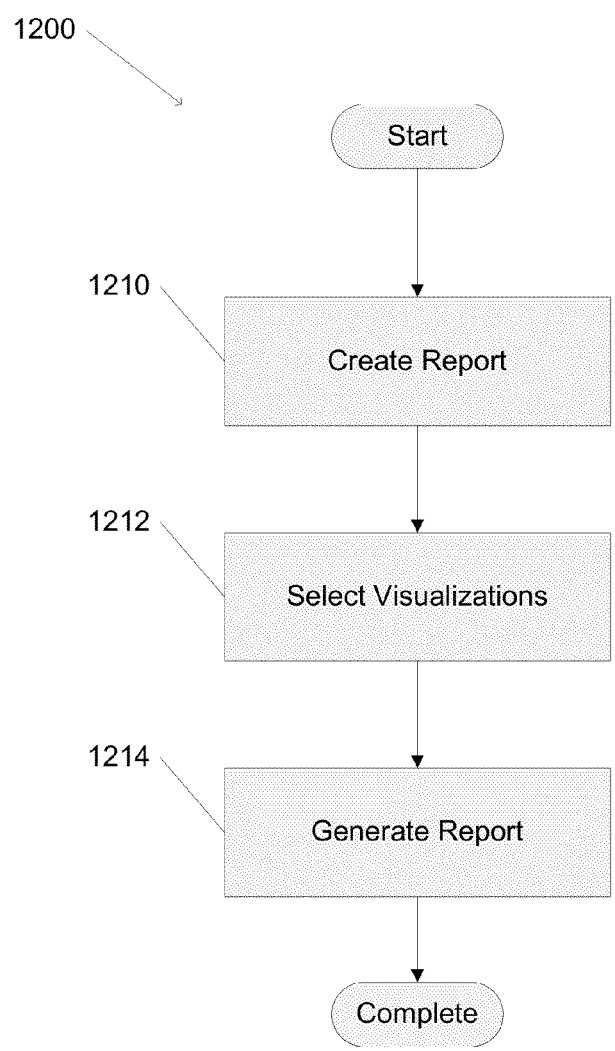
FIG. 12 is a flow chart illustrating a process for building a report in accordance with an embodiment of the invention.

Reports are the primary method for users to visualize, explore, and present data stored in interest-driven BI systems in accordance with many embodiments of the invention. Reports generated by users also define and cause updates to interest-driven data pipelines. A process for generating reports in accordance with an embodiment of the invention is illustrated in FIG. 12. The process 1200 involves creating (1210) a report and selecting (1212) visualizations to include in the report. In many embodiments, the users are creating and interacting with reports utilizing a BI reporting engine provided by the interest-driven BI system. Visualizations are capable of displaying any data stored in the interest-driven BI system. Users may define the data shown in visualizations, including defining various levels of aggregation of the data and combining data from multiple sources.

Based on the requirements for the visualizations, the interest-driven BI system utilizes interest-driven data pipelines to generate the data required to support the visualizations. Generating (1214) reports involves populating the visualizations present in the report using data provided by interest-driven data pipelines. Once the reports are generated they can be used and modified by users. Although a specific process for generating a report is illustrated in FIG. 12, any of a variety of processes appropriate to a specific application can be utilized to explore data using an interest driven BI system in accordance with embodiments of the invention. Processes for creating visualizations, selecting data for reports, and exploring data in accordance with embodiments of the invention are discussed further below.

Visualizations—the Budding Blocks of Reports

Figure 13:
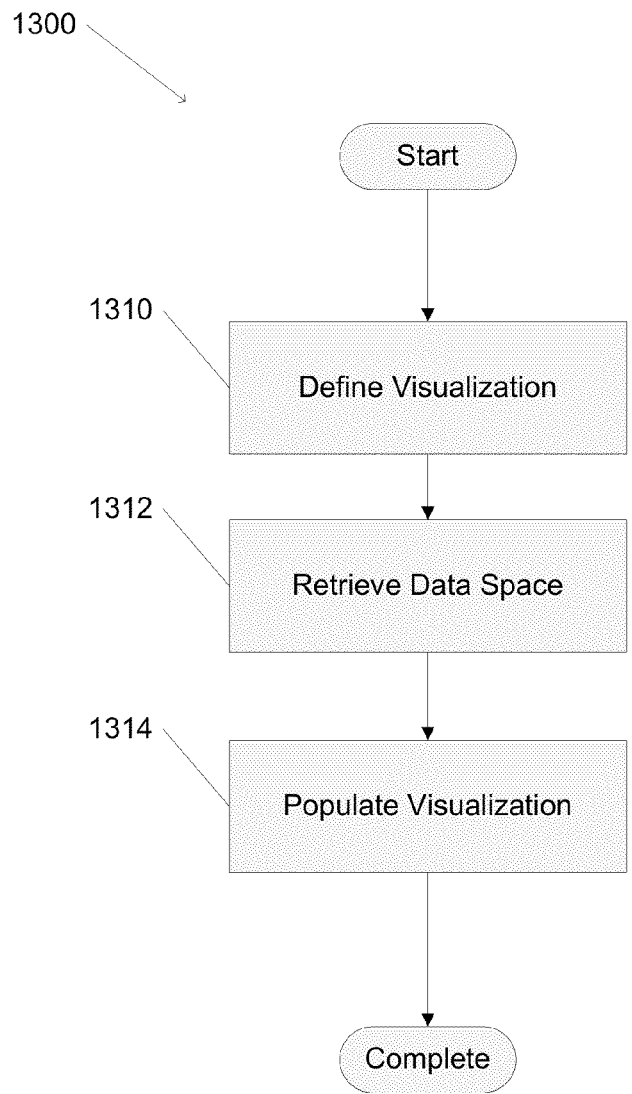
FIG. 13 is a flow chart illustrating a process for creating a visualization in accordance with an embodiment of the invention.

Visualizations, as the name suggests, are the actual viewable embodiment of data stored in an interest-driven BI system. Visualizations may take many forms, such as pie charts, bar charts, tables, or any other form, which enables the viewing of data. A process for defining and populating visualizations in accordance with an embodiment of the invention is illustrated in FIG. 13. The process 1300 involves defining (1310) a visualization. In several embodiments, defining (1310) a visualization includes defining filters and/or aggregations on data stored in an interest-driven BI system. In many embodiments, defining (1310) a visualization involves performing operation on an OLAP cube, such as slicing, dicing, and drilling down. Defining (1310) visualizations may also involve the creation of and interaction with a variety of data summarizations, such as pivot tables or rollups.

Once the visualization is defined, the data space containing the data that supports the visualization is retrieved (1312). In a number of embodiments, a data space may be any number of in-memory data models, such as an OLAP cube, a relational model, or objects stored in memory. Using the data space, the visualization is populated (1314), enabling the viewing of the data present in the visualization. In a number of embodiments, visualizations are created and displayed using a BI reporting engine. Although a specific process for generating visualizations is illustrated in FIG. 13, any of a variety of processes can be utilized in data exploration using a BI engine in accordance with embodiments of the invention. Additional processes for interacting with interest-driven BI systems in accordance with embodiments of the invention are discussed further below.

Visualizing Estimated Execution Time in Interest-Driven BI Systems

Figure 14:
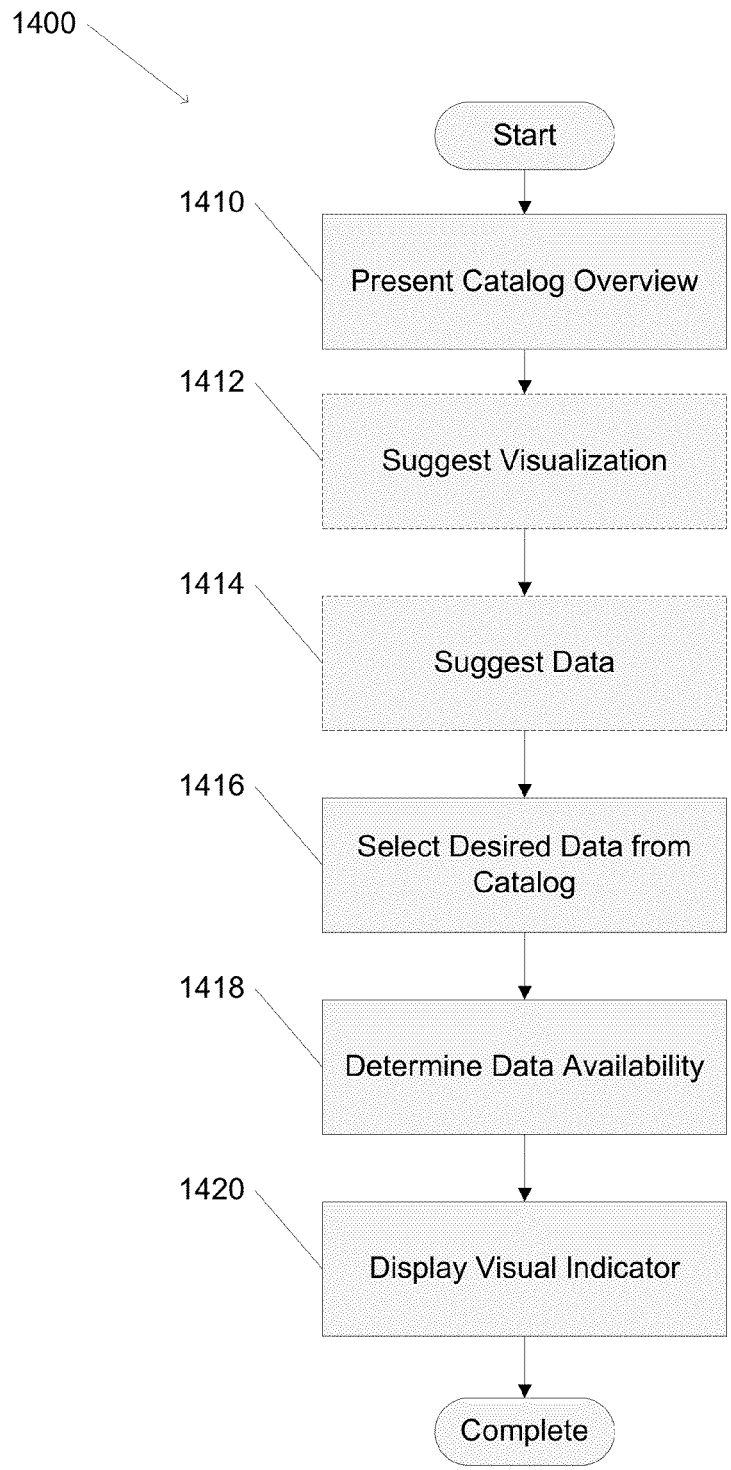
FIG. 14 is a flow chart illustrating a process for estimating time requirements for user-generated actions in accordance with an embodiment of the invention.

Interest-driven BI systems dynamically provide the user with access to a variety of raw data utilizing interest-driven data pipelines. However, the interest-driven BI system may not be able to provide this dynamic data access in a low-latency fashion in all cases. A process for estimating the amount of time involved in providing a particular piece of data or visualization to a user in accordance with an embodiment of the invention is illustrated in FIG. 14. The process 1400 involves presenting (1410) a catalog overview; the catalog overview includes a listing of data present in the interest-driven BI system. In a number of embodiments, the catalog overview presented (1410) is a product of a data wrangling process.

In many embodiments, the interest-driven BI system suggests (1412) visualizations which may be of interest to the user. In a number of embodiments, the interest-driven BI system suggests (1414) data, which the user may be interested in exploring. The desired data is selected (1416) from the catalog. The availability of the data is determined (1418) and a visual indicator is displayed (1420) indicating the amount of time to retrieve the desired data. For example, a stoplight system may be utilized to indicate the amount of time to retrieve the desired data: green indicates the data can be accessed quickly, yellow indicates the data may be accessed in a few minutes, and red indicates that accessing the data may take several hours due to the need to completely rebuild the data pipeline and/or run MapReduce processes over a significant proportion of the raw data.

In many embodiments, the determination (1418) of the availability of data depends on whether the data is present in an interest-driven data pipeline, and if so, what stage of the interest-driven data pipeline the data is in. Interest-driven BI systems are capable of dynamically creating and updating interest-driven data pipelines in order to provide access to any data present in the system. The visual indicator displayed regarding the availability of data not present in an existing interest-driven data pipeline may depend on the time involved in re-compiling the interest-driven data pipeline to provide the desired data.

Although a specific process for estimating data access times is described above, any of a variety of processes may be utilized in accordance with embodiments of the invention. These processes may be based on a variety of metrics, such as a processing power estimation, instead of the time-based stoplight system described above. Processes for exploring data in accordance with embodiments of the invention are discussed further below.

User Data Exploration in Interest-Driven BI Systems

Figure 15:
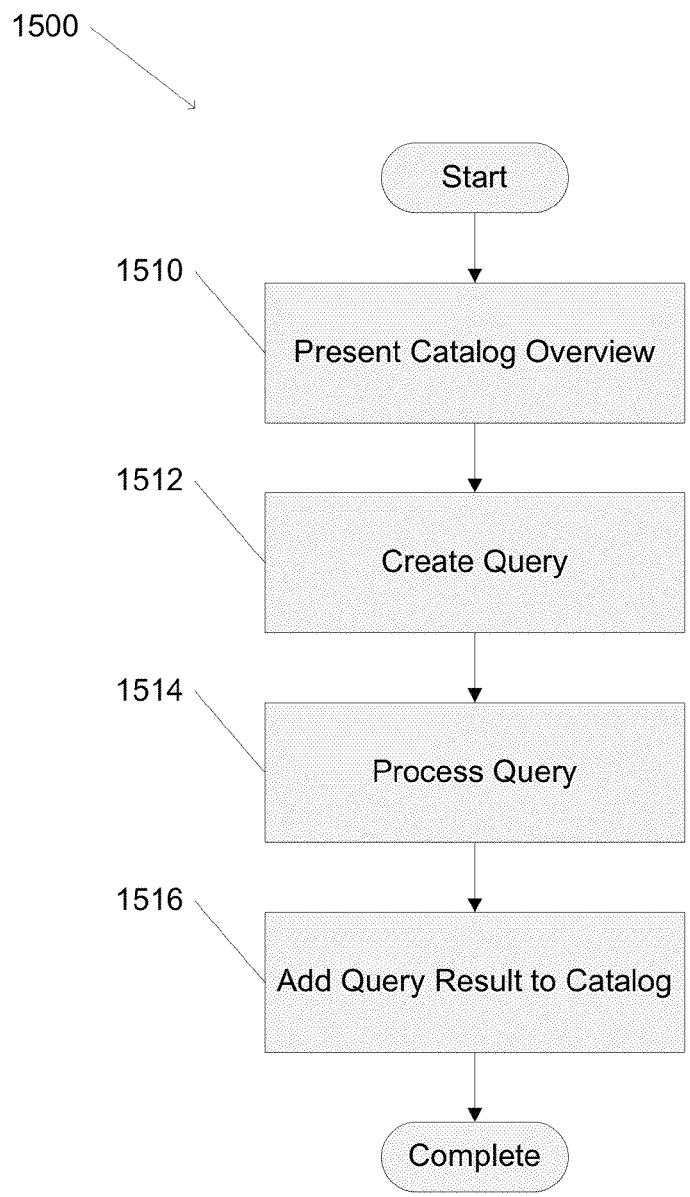
FIG. 15 is a flow chart illustrating a process for data exploration in accordance with an embodiment of the invention.

An important feature of many interest-driven BI systems is the ability for users to explore the data stored in the interest-driven BI system and to interact with that data, enabling the users to find additional data for creating reports. A process for data exploration using an interest-driven BI system in accordance with an embodiment of the invention is illustrated in FIG. 15. In a number of embodiments, the process 1500 is performed by a user utilizing a BI reporting engine. The process 1500 involves presenting (1510) a catalog overview to the user; the catalog overview includes a listing of data present in the interest-driven BI system. Users are able to create (1512) queries utilizing the data present in the catalog overview. The query is processed (1514). In many embodiments of the invention, the processing (1514) of the query is performed utilizing an interest-driven data pipeline. The result of the query is added (1516) to the catalog.

In a number of embodiments, the results of the query are capable of being used by all users of the interest-driven BI system. This sharing of query results can lead to many interesting features in an interest-driven BI system. For example, a collaborative aspect is added to many interest-driven BI systems by incorporating communication functionality along with sharing query results. Additionally, interest-driven BI systems in accordance with many embodiments of the invention include a store where particular queries and custom visualizations can be bought and sold across different businesses utilizing interest-driven BI systems.

Although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An interest-driven business intelligence system, comprising:
   a raw data storage system configured to contain raw data and perform extract, transform, and load (ETL) processes, where the raw data comprises unstructured data;
   metadata storage configured to contain metadata that describes the raw data;
   aggregate data storage configured to contain aggregate data, where aggregate data comprises structured data generated using ETL processes from the raw data;
   an intermediate processing layer;
   a business intelligence reporting engine;
   wherein the intermediate processing layer is configured to automatically:
      generate metadata describing the raw data;
      derive reporting data requirements from the at least one report specification based on the metadata; and
      automatically compile an interest-driven data pipeline based upon the reporting data requirements, where automatically compiling the interest-driven data pipeline comprises:
         generating ETL processing jobs to generate aggregate data from the raw data by:
            filtering the raw data using the structure of the raw data; and
            applying transformations to the raw data based on the structure of the raw data;

storing the aggregate data in the aggregate data storage;

generating reporting data including reporting data satisfying the reporting data requirements using the aggregate data; and storing the reporting data in a data mart within the intermediate processing layer for exploration by the business intelligence reporting engine;

wherein the business intelligence reporting engine is configured to:

receive metadata describing the raw data from the intermediate processing layer; and generate a user interface enabling user exploration of the metadata to define at least one report specification, where the user exploration involves selection of additional reporting data using the metadata; and wherein the intermediate processing layer is further configured to:

automatically update the reporting data requirements based upon the additional reporting data selected using the metadata via the business intelligence reporting engine;

automatically recompile the interest-driven data pipeline in real time to generate the additional reporting data selected using the metadata in response to the changes in the updated reporting data requirements by:

automatically generating ETL jobs to generate updated aggregate data from the raw data and providing the ETL jobs to the raw data storage;

automatically generating the additional reporting data using the updated aggregate data; and storing the additional reporting data in the data mart within the intermediate processing layer that includes the previously generated reporting; and wherein the business intelligence reporting engine is further configured to generate at least one report based upon the at least one report specification using the reporting data stored within the data mart within the intermediate processing layer.

2. The interest-driven business intelligence system of claim 1, wherein the raw data storage system is a data warehouse.

3. The interest-driven business intelligence system of claim 2, wherein the data warehouse is implemented utilizing a system selected from the group consisting of a distributed computing system, a database management system, and a NoSQL database.

4. The interest-driven business intelligence system of claim 2, wherein the data warehouse is a distributed computing system implemented utilizing Hadoop.

5. The interest-driven business intelligence system of claim 2, wherein the data warehouse is configured to store data generated utilizing the intermediate processing layer.

6. The interest-driven business intelligence system of claim 2, wherein the intermediate processing layer is configured to generate data warehouse requests.

7. The interest-driven business intelligence system of claim 6, wherein the data warehouse requests are requests selected from the group consisting of Hive queries and MapReduce operations.

8. The interest-driven business intelligence system of claim 1, wherein the intermediate processing layer is implemented utilizing a system selected from the group consisting of a distributed computing system, a database management system, and a NoSQL database system.

9. The interest-driven business intelligence system of claim 1, wherein the business intelligence reporting engine is configured to display an indication based upon the interactive exploration of the at least one report.

10. The interest-driven business intelligence system of claim 9, wherein the indication is an estimate of the time needed to update the reporting data requirements.

* * * * *